United States Patent [19]

Vrancken et al.

[11] 4,312,726

[45] * Jan. 26, 1982

[54] SEMI-TELECHELIC OLEFINICALLY-UNSATURATED ORGANIC POLYMERS

[75] Inventors: August Vrancken, Dworp; Paul Dufour, Ruisbroek, both of Belgium

[73] Assignee: UCB, Société Anonyme, Belgium

[*] Notice: The portion of the term of this patent subsequent to Dec. 4, 1996, has been disclaimed.

[21] Appl. No.: 3,479

[22] Filed: Jan. 12, 1979

Related U.S. Application Data

[62] Division of Ser. No. 517,822, Oct. 24, 1974, Pat. No. 4,177,338.

[51] Int. Cl.³ .............................................. C08F 8/14
[52] U.S. Cl. ........................ 204/159.23; 204/159.16; 204/159.19; 525/242; 525/302; 525/308; 525/316; 521/527; 526/211; 526/214; 526/271; 526/273; 526/320
[58] Field of Search ............... 526/211, 214, 271, 320, 526/273; 562/594; 560/154; 260/455 R; 204/159.16, 159.19, 159.24, 159.23; 525/308, 302, 316, 242

[56] References Cited

U.S. PATENT DOCUMENTS

| | | | |
|---|---|---|---|
| 3,441,589 | 4/1969 | Oswald | 260/455 |
| 3,528,844 | 9/1970 | Burlant et al. | 204/159.16 |
| 4,177,338 | 12/1979 | Vrancken et al. | 526/211 |
| 5,804,631 | 4/1974 | Faust | 204/159.16 |

FOREIGN PATENT DOCUMENTS 870191 6/1961 United Kingdom .

OTHER PUBLICATIONS

"Thioglycolic Acid," Pub. by Evans Chemetics Inc., N.Y., Nov. 4, 1965.

*Primary Examiner*—John Kight, III
*Assistant Examiner*—Amelia B. Yarbrough
*Attorney, Agent, or Firm*—Wenderoth, Lind & Ponack

[57] ABSTRACT

Organic polymer compounds having semi-telechelic olefinic unsaturation, which correspond to the general formula:

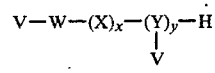

in which V is the radical of an organic compound containing at least one polymerizable

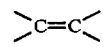

group and another group capable of reacting with the functional groups of organic compounds having radicals represented by W and Y; W is the radical of a chain transfer agent RSH, R being an organic radical having at least one hydroxyl or carboxyl group; X is the radical of an organic compound containing a polymerizable

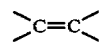

group; Y is the radical of an organic compound containing a polymerizable

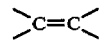

group and at least one other reactive group selected from hydroxyl, carboxyl, acid anhydride and epoxy groups; y is 0 or a whole number of from 1 to 10; x is the number of moles of X necessary to enable the chain —(X)ₓ— (Y)ᵧ— to have a molecular weight from 1000 to 10,000 and H is the hydrogen atom detached from the chain transfer agent RSH, the radical RS of which is represented by W in the above general formula; the radicals X and the radicals Y being distributed statistically along the polymer chain —(X)ₓ—(Y)ᵧ— in accordance with the polymerization kinetics; a process for the preparation thereof, compositions comprising them and coatings or mouldings comprising these compounds or compositions.

16 Claims, 2 Drawing Figures

SEMI-TELECHELIC OLEFINICALLY-UNSATURATED ORGANIC POLYMERS

This is a division of application Ser. No. 517,822, filed Oct. 24, 1974, now U.S. Pat. No. 4,177,338.

The present invention is concerned with organic polymer compounds having semi-telechelic olefinic unsaturation, and with compositions containing these compounds, as well as with the preparation and the use of these compounds and compositions.

The organic polymer compounds having semi-telechelic olefinic unsaturation according to the present invention have the general formula:

(I)

in which V is the radical of an organic compound containing at least one polymerizable group and another group capable of reacting with the functional groups of organic compounds, the radicals of which are represented by W and Y; W is the radical of a chain transfer agent RSH, R being an organic radical having at least one hydroxyl or carboxyl group, X is the radical of an organic compound contaning a polymerizable group, Y is the radical of an organic compound containing a polymerizable group and at least one other reactive group selected from hydroxyl, carboxyl, acid anhydride and epoxy groups, y is 0 or a whole number of from 1 to 10, x is the number of moles of X necessary to enable the chain $-(X)_x-(Y)_y-$ to have a molecular weight from 1000 to 10,000, and H is the hydrogen atom detached from the chain transfer agent RSH, the radical RS of which is represented by W in the above general formula (I), all of the radicals X and Y being distributed statistically along the polymer chain $-(X)_x-(Y)_y-$ in accordance with the polymerization kinetics.

In the present Specification, the term "organic polymer compounds with semi-telechelic olefinic unsaturation" is to be understood to mean macromolecular organic compounds which, at one end of the polymer chain, contain a radical containing at least one polymerizable group, which is designated V in the above general formula (I).

It will be noted that it is the compound, the radical of which is designated V, which introduces the olefinic unsaturation into the polymer compounds according to the present invention. For this purpose, this compound must contain, in addition to the group another group to establish the bonds V—W and $(Y)_y$—V. If y is 0 in the general formula, then $(Y)_y$—V is similarly equal to 0 and the polymer chain contains, as its only reactive group, the group having semi-telechelic olefinic unsaturation; on the other hand, if y is 1 to 10, then, in addition to the semi-telechelic olefinic group, the chain contains 1 to 10 pendant organic radicals, each of which contains at least one polymerizable group and which are statistically distributed along the polymer chain in accordance with the polymerization kinetics.

From the definition given above of the compounds according to the present invention, it is seen that the compound, the radical of which is designated V, must contain, as its other reactive group, a functional group capable of reacting with the hydroxyl or carboxyl groups of the compound, the radical of which is designated W, and with the hydroxyl, carboxyl, acid anhydride and epoxy groups of the compound, the radical of which is designated Y. Examples of compounds, the radical of which is designated V, include the following:

(a) for reaction with the carboxyl groups of W and Y:
in ethylenically unsaturated alcohol, for example allyl alcohol, partial acrylic and methacrylic esters of di- or polyhydroxy compounds, for example ethylene glycol mono(meth)acrylate, propylene-1,2- and 1,3-glycol mono(meth)acrylate, butylene-1,4-glycol mono(meth)acrylate, hexamethylene-1,6-glycol mono(meth)acrylate, diethylene glycol mono(meth)acrylate, triethylene glycol mono(meth)-acrylate, dipropylene glycol mono(meth)acrylate, glycerol mono- and di(meth)acrylate, pentaerytritol mono-, di- and tri(meth)acrylate and the like, and glycidyl(meth)acrylate and the like.

(b) for reaction with the hydroxyl groups of W and Y:
an ethylenically unsaturated carboxylic acid, for example acrylic acid, methacrylic acid, maleic acid, fumaric acid, itaconic acid, vinylacetic acid, acrylaminoglycolic acid and the like and also their functional derivatives, for example acid anhydrides, acid halides, transesterifiable esters and the like, methyl, ethyl, propyl, butyl, isobutyl and 2-ethylhexyl monomaleates or monofumarates and the like, the addition products of one molecule of a partial acrylic acid or methacrylic acid ester of a polyhydroxy organic compound, i.e. (meth)acrylic hydroxyalkyl ester, for example ethylene glycol monoacrylate, to one molecule of an aliphatic or aromatic organic diisocyanate, for example hexamethylene diisocyanate or p-toluylene diisocyanate, in order to form compounds which still contain a free NCO group capable of reacting with the hydroxyl groups of W and Y, for example those of the formulae:

and the like, N-methylol-acrylamide and its alkoxylated derivatives, for example N-butoxymethyl-acrylamide, N-methoxymethyl-acrylamide, diacetoneacrylamide and the like, the corresponding derivatives of N-methylolmethacrylamide and the like.

(c) for reaction with the acid anhydride groups of Y: use may be made of all the compounds mentioned above in (a).

(d) for reaction with the epoxy groups of Y: use may be made of all the acids and anhydrides mentioned above in (b).

As chain transfer agents, the radical of which is designated W in the above general formula, it is possible to use all those which correspond to the general formula RSH, in which R is an organic radical carrying at least one hydroxyl or carboxyl group, for example beta-mercaptoethanol, 1-thioglycerol and the like (transfer agent with the hydroxyl group); and thioglycolic acid, thiolactic acid, 3-mercaptopropionic acid, thiomalic acid and the like (transfer agent with carboxyl group).

As examples of compounds, the radical of which is represented by X in the above general formula, mention may be made of acrylic acid and methacrylic acid alkyl esters, such as methyl, ethyl, butyl and 2-ethylhexyl acrylate and/or methacrylate and the like, acrylamide and methacrylamide, acrylonitrile, and methacrylonitrile, vinyl acetate, styrene, alpha-methylstyrene, the vinyl ethers and the like and, in general, all compounds containing a polymerizable group, these various compounds being used alone or mixed with one another.

As examples of compounds, the radical of which is represented by Y in the above general formula, there are, in particular, mentioned allyl alcohol, acrylic acid, methacrylic acid, maleic acid, fumaric acid, itaconic acid, acrylaminoglycolic acid, acrylic and methacrylic monoesters of di- and polyhydroxy compounds, for example 2-hydroxyethyl, 2-hydroxypropyl, 3-hydroxypropyl and 4-hydroxybutyl acrylates or methacrylates and the like, glycidyl acrylate and methacrylate, maleic anhydride, itaconic anhydride, methyl, ethyl, propyl, butyl, isobutyl and 2-ethylhexyl monomaleates and monofumarates and the like, these various compounds being used alone or mixed with one another.

With regard to the linear polymer chain $-(X)_x-(Y)_y-$, it is to be understood that the x molecules of X and the y molecules of Y are distributed statistically along the chain in accordance with the polymerization kinetics, i.e. it is not a question of blocks containing x molecules of X and blocks containing y molecules of Y. As already specified above, the value of y is 0 or a whole number of from 1 to 10, while x is the number of moles of X necessary to enable the chain $-(X)_x-(Y)_y-$ to have a molecular weight of 1000–10,000.

The process for the preparation of the organic polymer compounds having semi-telechelic olefinic unsaturation according to the present invention can be carried out in two stages:

First stage

A linear polymer of general formula:

in which W, X, x, Y and y have the meanings given in general formula (I), is prepared by radical polymerization, the resulting polymer containing at least one reactive group on W which is selected from hydroxyl and carboxyl groups, while, when y is other than 0, the polymer contains, in addition, y (y=1 to 10) reactive groups selected from hydroxyl, carboxyl, acid anhydride and epoxy groups. The polymerization may be carried out in the mass (without solvent), in a solution in an organic solvent or in a suspension in an aqueous medium. Thus, in the most general case of solution polymerization in an organic solvent, the monomers, the radicals of which are designated X and Y, are copolymerized in an inert organic solvent, for example benzene, toluene, xylenes or the like, in an inert gaseous atmosphere, for example nitrogen, carbon dioxide, argon, methane or the like, in the presence of a small amount of a radical polymerization initiator (less than 0.3% by weight of the resulting linear polymer), such as benzoyl peroxide, lauroyl peroxide, acetyl cyclohexanesulfonyl peroxide, diisobutyryl peroxide, decanoyl peroxide, t-butyl hydroperoxide, di-(2-ethylhexyl) peroxydicarbonate, diisopropyl peroxydicarbonate, t-butyl peroxypivalate, azo-bis-(isobutyronitrile), 4,4′-azo-bis-(4-cyanopentanoic acid), 3,3′-azo-bis-(3-cyanobutanol) or the like, and a large amount (1 to 10% by weight of the resulting linear polymer) of the transfer agent RSH, the radical of which is designated W above. There is thus obtained a linear polymer containing at least 90% by weight of reactive semi-telechelic chains which contain at least one reactive hydroxyl or carboxyl group supplied by the transfer agent, together with any reactive groups introduced into the macromolecule by the compound, the radical of which is designated Y, when y is other than 0.

Second stage

The reactive linear polymer of general formula (II), prepared in the first stage, is reacted with a compound containing at least one polymerizable group and at least one other group capable of reacting with Y and W in the linear polymer of general formula (II). This compound, the radical of which is designated V in general formula (I), has been defined above. As already explained, the reactive group of V must be capable of reacting simultaneously with the reactive groups of W and Y; if, for example, Y and W contain a carboxyl group, V must carry a free hydroxyl group, whereas if W and Y carry a hydroxyl group, V must carry a free carboxyl group, and so on. W and Y preferably both have the same type of reactive group.

Thus, a polymerization inhibitor (hydroquinone or the like), a catalyst (p-toluene-sulfonic acid or the like in the case of an esterification reaction) and the olefinically-unsaturated compound, the radical of which is designated V in general formula (I), are added to the polymer of general formula (II). Esterification can be effected by heating the polymer solution, while eliminating azeotropically the water of esterification with the solvent of the solution, until the desired degree of esterification has been achieved. The polymer of general formula (I) thus obtained is then isolated by removing the solvent and esterification catalyst. The polymer of general formula (I) may be used as it is but it is preferably mixed with olefinically-unsaturated monomers, for example acrylic esters, such as methyl (meth)-acrylate ethyl (meth)acrylate or the like, ethylene glycol di(meth)acrylate, butane-1,4-diol di(meth)acrylate or the like, styrene, vinyl acetate or the like, in any desired proportions, these proportions being dictated by the technological application requirements, for example the desired rheological properties, the mechanical properties required of the articles which are to be manufactured and so on.

In Table I below, there are listed examples of organic polymer compounds having semi-telechelic olefinic unsaturation according to the present invention. In this Table the following abbreviations are used:
AA: acrylic acid
AE: ethyl acrylate
ALL: allyl alcohol
Anh Mal: maleic anhydride
ATG: thioglycolic acid
GLM: glyceromercaptan ($CH_2OH$—$CHOH$—$CH_2SH$)
HEA: 2-hydroxyethyl acrylate
HEMA: 2-hydroxyethyl methacrylate
HOEtSH: beta-mercaptoethanol
HPMA: 2-hydroxypropyl methacrylate
IPDI: isophorone diisocyanate
MAG: glycidyl methacrylate
MMA: methyl methacrylate
TDI: toluylene diisocyanate

TABLE I

| Compound No. | Starting functional copolymer of formula (II) W—$(X)_x$—$(Y)_y$—H | | | Esterified with V V being |
|---|---|---|---|---|
| | W | X | Y | |
| 1 | HOEtSH | MMA | HPMA | AA |
| 2 | GLM | MMA | — | AA |
| 3 | GLM | MMA | HPMA | AA |
| 4 | HOEtSH | MMA + AE | HEMA | AA |
| 5 | GLM | MMA + AE | HEMA | AA |
| 6 | HOEtSH | AE | HEA | AA |
| 6bis | HOEtSH | AE | HEA | Anh Mal |
| 6ter | HOEtSH | AE | HEA | TDI + HEA |
| 7 | ATG | AE | AA | ALL |
| 7bis | ATG | AE | AA | HEA |
| 7ter | ATG | AE | AA | MAG |
| 8 | HOEtSH | MMA + AE | HEA | IPDI + HEMA |
| 9 | HOEtSH | MMA | — | AA |

It will be noted that a plurality of compounds, which may be very different depending upon the respective proportions of W, X and Y, correspond, in fact, to each of the compounds indicated in the Table above. W regulates the molecular weight of the compound obtained, this molecular weight being lowered when a greater amount of W added. The nature of X determines the rigidity and the flexibility of the products obtained. The concentration of Y causes a variation of concentration of the statistical olefinic unsaturation of the chain, to which is obviously added the semi-telechelic olefinic unsaturation. It should also be noted that V determines, ipso facto, the nature of the olefinic unsaturation introduced into the polymer chain and, consequently, its reactivity, the latter varying in the increasing order of allylic→methacrylic→acrylic unsaturation. Similarly, if isocyanates are used, these will influence the viscosity of the products obtained. Furthermore, as previously indicated, when the compounds according to the present invention are subsequently copolymerized, in admixture with other olefinically-unsaturated monomers, the latter, which obviously must be compatible, will also influence the physical and chemical properties of the products obtained.

In comparison with the corresponding polymer compounds which contain only statistically distributed olefinic unsaturation, the polymer compounds having semi-telechelic olefinic unsaturation according to the present invention offer considerable advantages. In those compounds in which the olefinic unsaturation is distributed statistically along the chain, there is a defect in that macromolecules rich in olefinic unsaturation adjoin other macromolecules which, in the limiting case, contain no olefinic unsaturation. The lower the molar weight of the synthetized polymers and the lower the value of Y, the more pronounced is this phenomenon. Additionally the composition of the mixture of comonomers used varies considerably from its original value in the course of the polymerization, increasing still further the heterogeneity of distribution of the reactive sites by kinetic effect. Furthermore, the olefinic unsaturations within the chain are less reactive, because of steric hindrance, than those situated near the end of the chain. All this has the consequence that the final products obtained upon cross-linking these conventional unsaturated polymers are partly composed of too highly cross-linked portions alternating with insufficiently cross-linked portions, as is easily discovered by determining the insoluble fraction of the products obtained.

The theory of Flory (see "Principles of Polymer Chemistry," pages 347 to 374, Cornell University Press, New York, 1953), shows that the insolubilization of a resin having non-statistical distribution of the cross-linking sites takes place starting from two bonds per chain. The statistical distribution of the sites makes it necessary to operate at a much higher rate of unsaturation than the theoretical minimum in order to achieve maximum insolubilization, having regard for the low molecular weights involved. This results in heterogeneity in the density of cross-linking, together with, as stated above, the formation of centers of high density which impart poorer mechanical properties to the hardened polymer.

The most important advantage of the compounds used according to the present invention, in comparison with the aforesaid conventional polymers, is that they are composed of macromolecular chains, practically all of which contain at least one cross-linkable olefinic site, i.e. the site which is situated at one (semi-telechelic) end of each macromolecular chain, in addition to the pendant olefinic sites which may be present along the macromolecular chain. Furthermore, these terminal cross-linkable olefinic sites are more reactive than those which are situated inside the chain, because of the lower degree of steric hindrance. Additionally, from the economic point of view, it is less expensive to introduce the cross-linkable semi-telechelic olefinic sites into the macromolecule by V—W— than it is to introduce the cross-linkable statistical olefinic sites into the macromolecular chain by $-(Y)_y-V$ in the general formula (I) given above. Finally, with equal olefinic unsaturation, the compounds of the present invention have a higher degree of insolubilization and, therefore, improved resistance to solvents as compared with the traditional compounds of comparable nature, as will be shown clearly hereinbelow, in Examples 1 to 17 and in the accompanying FIGS. 1 and 2.

Depending on the nature of their components, the compounds according to the present invention are in the form of liquids, viscous syrups or resinous solids and are colourless or slightly coloured, and odourless. Because of their great reactivity, they must be protected against light during storage, while radical inhibitors must be added to them, as is done for all polymerizable substances in general. The compounds of the present invention are preferably used dissolved in olefinically-unsaturated monomers, for example styrene, acrylic or methacrylic esters or the like, while, as previously stated, it is possible to use any weight ratio between the compounds according to the present invention and the unsaturated monomers. In this case, the same precautions must also be taken with respect to storage as for the compounds according to the present invention which are used alone.

The compounds according to the present invention and also solutions thereof in olefinically-unsaturated monomers, are highly polymerizable and form three-dimensional cross-linked polymers under the following conditions:

(a) by the action of heat, preferably in the absence of oxygen;

(b) by the addition of radical initiators which decompose at elevated temperatures, for example, starting from 40° C., or even at ambient temperature, provided that an accelerator is added;

(c) by exposure to ionizing radiation of an electromagnetic nature (gamma rays or x-rays), or of a corpuscular nature (accelerated electrons), without any additive being necessary;

(d) in visible or ultra-violet light, provided that a photosensitizer or photoinitiator is added.

Depending on the applications for which they are intended, the compounds according to the present invention or their solutions in olefinically-unsaturated monomers may contain the usual additives, such as:

(a) known heat and light stabilizers;

(b) known antioxidants;

(c) known viscosity modifying agents or thixotropic agents;

(d) known flow agents;

(e) chain transfer agents serving to accelerate radical polymerization once it has stated; examples of these agents include the di- and triamines, alkanolamines, monoalkyldialkanolamines and dialkylmonoalkanolamines, morpholine and its derivatives, the polyamines, N-phenylglycine and its derivatives and the like;

(f) polymerization inhibitors intended to provide stability during storage, for example, quinones, hydroquinones,, substituted phenol derivatives, primary aromatic amines, copper comounds and the like;

(g) waxes, the role of which is to assist in obtaining non-scratch, hardened films, which waxes may be natural, such as candelilla wax, carnauba wax or the like, or synthetic, such as polyethylene, polypropylene, paraffin, chlorinated paraffin, chlorinated naphthalene waxes or the like;

(h) pigments and dyes;

(i) mineral or organic fillers;

(j) fibrous or pulverulent reinforcing agents and the like.

The compounds and compositions according to the present invention may be used in all applications which are generally reserved for traditional polymerizable compounds and compositions but especially in cases where it is desired that the polymerization should be effected within the minimum period of time. It is for this reason that they are outstandingly suitable as binders in paints, coatings and varnishes and as compression moulding, injection moulding and casting compositions, the hardening of the shaped articles thus obtained being effected by heat, by the addition of catalysts, by the use of ultra-violet rays or by electron beams or the like.

More particularly, in the production of varnish and paint, the compounds according to the present invention offer great advantages over traditional polymerizable binders. Unlike the latter, indeed, the compounds according to the present invention may have a shorter chain length and, therefore, lower viscosity, while having the same cross-linking capacity, because of the existence of the semi-telechelic olefinic unsaturation on practically the totality of the polymer chains. On the other hand, in traditional polymerizable compounds haing statistical unsaturation, it is necessary to have larger macromolecular chains in order to increase the probability of the presence of at least one double olefinic bond in each macromolecule, thus unavoidably increasing the viscosity of these compounds. Otherwise, if it is desired to produce traditional polymerizable compounds with a short chain length in order to enable them to have low viscosity, since they cannot form polymerized products with a sufficiently high insoluble fraction, it is necessary to compensate for this defect by adding other monomeric compounds which are rich in polymerizable olefinic bonds; however, these give more brittle final products which do not have as good mechanical properties. Finally, an advantageous feature of the compounds of the present invention is that they can be used without having recourse to inert solvents which would have to be evaporated during the formation of the film of paint or varnish.

The following Examples are given for the purpose of illustrating the present invention; unless otherwise stated, the parts and percentages are by weight.

EXAMPLES 1 TO 17

In these Examples, the preparation of a series of prepolymers having statistical unsaturation outside the scope of the present invention (Examples 1 to 7), and also a series of prepolymers having semi-telechelic unsaturation according to the present invention (Examples 8 to 14) and having bi-semitelechelic unsaturation also according to the present invention (Examples 15 to 17) is described and their behavior on polymerization with ultra-violet rays and with electron beams (Table II) is compared.

(I) EXAMPLES 1 TO 7

Synthesis of polymers having statistical unsaturation outside the scope of the present invention A series of prepolymers having statistical unsaturation which differ from one another solely in respect of the rate of unsaturation is prepared.

(a) Preparation of the hydroxyl-containing copolymer 1000 g. toluene are first introduced into a glass reactor having a capacity of 3 liters and provided with a double heating wall, an agitator, a thermometer, a reflux condenser, a tube for the admission of nitrogen, and a dropping funnel. The toluene is heated in an atmosphere of nitrogen until it is boiling under reflux (110° C.). Reflux heating is maintained for 15 minutes and then, over a period of 4 hours, there is introduced a mixture of 1000 g. methyl methacrylate (MMA) and 2-hydroxypropyl methacrylate (HPMA) monomers, the mixture having the MMA/HPMA ratio indicated in Table II, and also 40 g. azo-bis-isobutyronitrile.

After the monomers have been added, reflux heating is continued for 4 hours. The mean yield of hydroxyl-containing copolymer is 90–95% by weight, referred to the theoretical yield.

The hydroxyl-containing copolymer is isolated from the reaction mixture by precipitation with hexane. The copolymer is then redissolved in acetone and reprecipitated with water. The copolymer is thoroughly drained, redissolved in acetone and again precipitated with hexane, whereupon it is washed with hexane and dried in vacuo at 50° C. to a constant weight.

For each hydroxyl-containing copolymer prepared there are determined the hydroxyl group content (in milliequivalents per gram), the intrinsic viscosity in tetrahydrofuran at 25° C. (in ml/g.), and the molecular weight M by vapor phase osmometry ($M_{VPO}$) and/or by gel permeation chromatography ($M_{GPC}$).

(b) Introduction of statistical unsaturation into the hydroxyl-containing copolymer Esterification of the hydroxyl groups of the hydroxyl-containing copolymer prepared in (a) is then effected with the aid of acrylic acid. The operation is carried out in the same apparatus as described above but the reflux condenser is replaced by an azeotropic distillation column.

800 g. of the hydroxyl-containing copolymer are dissolved in 800 g. toluene and then there is added twice the amount of acrylic acid necessary for the esterification of the hydroxyl groups, 16 g. p-toluene-sulfonic acid (i.e. 2% by weight of catalyst, referred to the hydroxyl-containing copolymer) and 40 mg hydroquinone (i.e. 50 ppm by weight, referred to the hydroxyl-containing copolymer).

Esterification is effected by boiling the mixture in an atmosphere of nitrogen. The water formed by the esterification reaction is azeotropically entrained by the toluene and separated, the toluene being returned to the reactor. Esterification is then continued for about 6 hours, until no further water distils off. The progress of the esterification can be continuously determined from the amount of water distilled and by measuring the acidity of the esterification solution.

The prepolymer having statistical unsaturation which is prepared in this way is purified in the following manner: the esterification solution is precipitated by n-hexane and then the prepolymer is twice reprecipitated by water from its solution in actone and finally is reprecipitated by hexane, washed with hexane and then dried in vacuo at ambient temperature to a constant weight.

With the prepolymer obtained in this manner, the following are determined:

the unsaturation content by bromination and infrared spectrophotometry; it is expressed in milliequivalents of double bond per g. (abbreviated as meq db/g), and the molecular weight $\overline{M}$ being known, it is possible to calculate the number of double bonds per chain (number of db/chain);

the content of hydroxyl groups, which is determined as in (a) and which is generally less than 0.1 meq/g;

intrinsic viscosity, which is measured as in (a);

the molecular weight $\overline{M}$, which is also measured as in (a).

The results are given in the following Table II.

(II) EXAMPLES 8 TO 14

Synthesis of polymers having semi-telechelic unsaturation according to the present invention The apparatus used in the same as that described in Examples 1 to 7.

(a) Preparation of the hydroxyl-containing copolymer

After carefully purging the reactor with nitrogen, the following amounts of raw materials are introduced into it:

1000 g. benzene
100 g. MMA/HPMA mixture, the MMA/HPMA ratio varying as indicated in Table II
50 g. beta-mercaptoethanol
1 g. azo-bis-isobutyronitrile.

The hydroxyl-containing copolymer is prepared as in Example 1 by heating the mixture at 60° C. for about 4 hours. It is then purified as in Example 1.

(b) Introduction of semi-telechelic statistical unsaturation into the hydroxyl-containing copolymer The unsaturated polymer is prepared by esterifying the hydroxyl-containing copolymer prepared in (a) with acrylic acid, under the same conditions as in Examples 1 to 7, whereafter it is then purified in the manner indicated in these Examples (See Table II).

(III) EXAMPLES 15 TO 17

Synthesis of polymers having bi-semi-telechelic unsaturation in accordance with the present invention The apparatus used is the same as that described in Examples 1 to 7.

(a) Preparation of the hydroxyl-containing copolymer

The operation is the same as in part (a) of Examples 8 to 14, except that the 50 g. beta-mercaptoethanol are replaced by 80 g. 1-glyceromercaptan.

(b) Introduction of bi-semi-telechelic statistical unsaturation into the hydroxyl-containing copolymer The unsaturation is introduced into the hydroxy-containing copolymer prepared in (a) by esterification with acrylic acid in the manner indicated in part (b) of Examples 1 to 7 and is then purified in the manner indicated in these Examples (see Table II). In Example 15, only one of the two OH groups of 1-glyceromercaptan has been esterified.

(IV) COMPARISON OF THE REACTIVITY OF THE UNSATURATED POLYMERS PREPARED IN EXAMPLES 1 TO 17, UPON POLYMERIZATION

The unsaturated prepolymers of Examples 1 to 17 are subjected to polymerization, which is initiated, on the one hand, by ultra-violet rays (UV irradiation) and, on the other hand, by accelerated electron beams (EBC irradiation).

The percentage by weight of undissolved gel for each film examined is determined as in the case of UV irradiation, the results being given in Table II.

TABLE II

| | Hyroxyl containing copolymer | | | | | | Unsaturated prepolymer | | | | | % gel by irradiation | |
|---|---|---|---|---|---|---|---|---|---|---|---|---|---|
| Test No. | % MMA | % HPMA | % HOEtSH on monomers | % glycero-mercaptan on monomers | $\overline{M}_{GPC}$ | meq OH/g | meq db/g | meq OH/g | [n] ml/g | $\overline{M}_{GPC}$ | number of db/chain | UV | EBC |
| 1 | 97.4 | 2.6 | — | — | 3,700 | 0.20 | 0.18 | 0 | 6.9 | 3,600 | 0.65 | 20.4 | 0 |
| 2 | 95 | 5 | — | — | 3,500 | 0.30 | 0.30 | 0.06 | 7.0 | 3,800 | 1.14 | 36.5 | 0 |
| 3 | 92 | 8 | — | — | 3,700 | 0.61 | 0.60 | 0.03 | 6.8 | 3,800 | 2.3 | 62.8 | 2.0 |
| 4 | 90 | 10 | — | — | 3,600 | 0.70 | 0.70 | 0 | 6.7 | 3,500 | 2.5 | 61.9 | 2.0 |
| 5 | 87 | 13 | — | — | 3,500 | 0.85 | 0.85 | 0.04 | 6.9 | 3,700 | 3.1 | 70.0 | 35.1 |
| 6 | 84 | 16 | — | — | 3,600 | 1.05 | 1.0 | 0.09 | 6.8 | 3,800 | 3.8 | 78.8 | 43.4 |
| 7 | 80 | 20 | — | — | 3,400 | 1.40 | 1.3 | 0.08 | 7.0 | 3,500 | 4.5 | 81.1 | 51.2 |
| 8 | 100 | 0 | 5 | — | 2,700 | 0.37 | 0.35 | 0 | 6.4 | 2,700 | 0.95 | 0 | 0 |
| 9 | 97.4 | 2.6 | 5 | — | 3,100 | 0.58 | 0.50 | 0.04 | 6.4 | 3,200 | 1.6 | 65.1 | 29.1 |
| 10 | 95 | 5 | 5 | — | 3,000 | 0.73 | 0.70 | 0.06 | 6.9 | 3,500 | 2.5 | 73.0 | 62.9 |
| 11 | 92 | 8 | 5 | — | 3,200 | 0.88 | 0.83 | 0.05 | 6.8 | 3,400 | 2.8 | 84.6 | 80.7 |
| 12 | 90 | 10 | 5 | — | 3,500 | 1.07 | 1.00 | 0.06 | 7.0 | 3,500 | 3.5 | 87.5 | 81.8 |
| 13 | 87 | 13 | 5 | — | 3,100 | 1.38 | 1.30 | 0.05 | 6.7 | 3,200 | 4.1 | 89.7 | 89.7 |
| 14 | 84 | 16 | 5 | — | 3,100 | 1.60 | 1.45 | 0.10 | 6.5 | 3,100 | 4.5 | 92.0 | 92.7 |
| 15 | 100 | 0 | — | 8 | 3,200 | 0.80 | 0.30 | 0.45 | 7.0 | 3,000 | 0.9 | 0 | |
| 16 | 100 | 0 | — | 8 | 3,200 | 0.80 | 0.62 | 0.09 | 7.1 | 3,100 | 1.9 | 85.6 | |
| 17 | 90 | 10 | — | 8 | 3,000 | 1.45 | 1.40 | 0.10 | 7.0 | 3,200 | 4.5 | 92.5 | |

UV irradiation

With each of the unsaturated prepolymers prepared according to Examples 1 to 17, there is prepared a solution having the following composition:

65 parts by weight of the unsaturated prepolymer which is to be examined, 35 parts by weight methyl methacrylate, 0.5 part by weight benzoin methyl ether (MEB).

1.2 g. of this solution is then spread on an aluminum dish of 6 cm. diameter, which represents a layer thickness of the substance of about 500 microns. A sheet of "Mylar" with a thickness of 12 microns is applied directly to this layer, in order to prevent the polymerization-inhibiting action of atmospheric oxygen on the solution and to reduce evaporation.

Irradiation is effected for 30 minutes with a 100-watt low pressure mercury UV lamp at a distance of 20 cm.

In the polymerized film obtained in this manner, there is determined the percentage by weight of gel which is not dissolved by extraction with methyl ethyl ketone for 24 hours. The higher is this percentage, the higher the cross-linking rate of the final polymer will be and the better will be the resistance of the film to solvents in general (see Table II).

EBC irradiation

With each of the unsaturated prepolymers prepared in accordance with Examples 1 to 14, there is prepared a solution having the following composition:

60 parts by weight of the unsaturated prepolymer which is to be examined, 40 parts by weight of ethyl acrylate, 0.5 g. of the solution is then spread on an aluminum dish and to the layer thus formed there is applied a sheet of "Mylar" with a thickness of 12 microns.

A dose of 5 Mrads is applied in each case under the following conditions:

Brown Boveri EBC accelerator

Dose rate: 10 Mr/second

300 KeV 50 mA

As will be seen from Table II, unsaturated polymers have been prepared with molecular weights $\overline{M}_{GPC}$ of the same order of magnitude so that results should be comparable. It will also be seen that, by going respectively from Example 1 to Example 7, from Example 8 to Example 14 and from Example 15 to Example 17, the unsaturation rate (see "number of db/chain" column) increases and that, in each of these three categories of unsaturated polymers, the same degree of unsaturation can be reached. However, when we examine the last two columns of the Table, we see that the gel percentage, both by UV irradiation and EBC irradiation, is considerably greater in the case of the unsaturated prepolymers in accordance with the present invention, as compared with those of the prior art, the latter containing only statistical unsaturation. This can clearly be seen when the results of Table II are reproduced in the form of the attached graphs (FIGS. 1 and 2).

Figure 1:
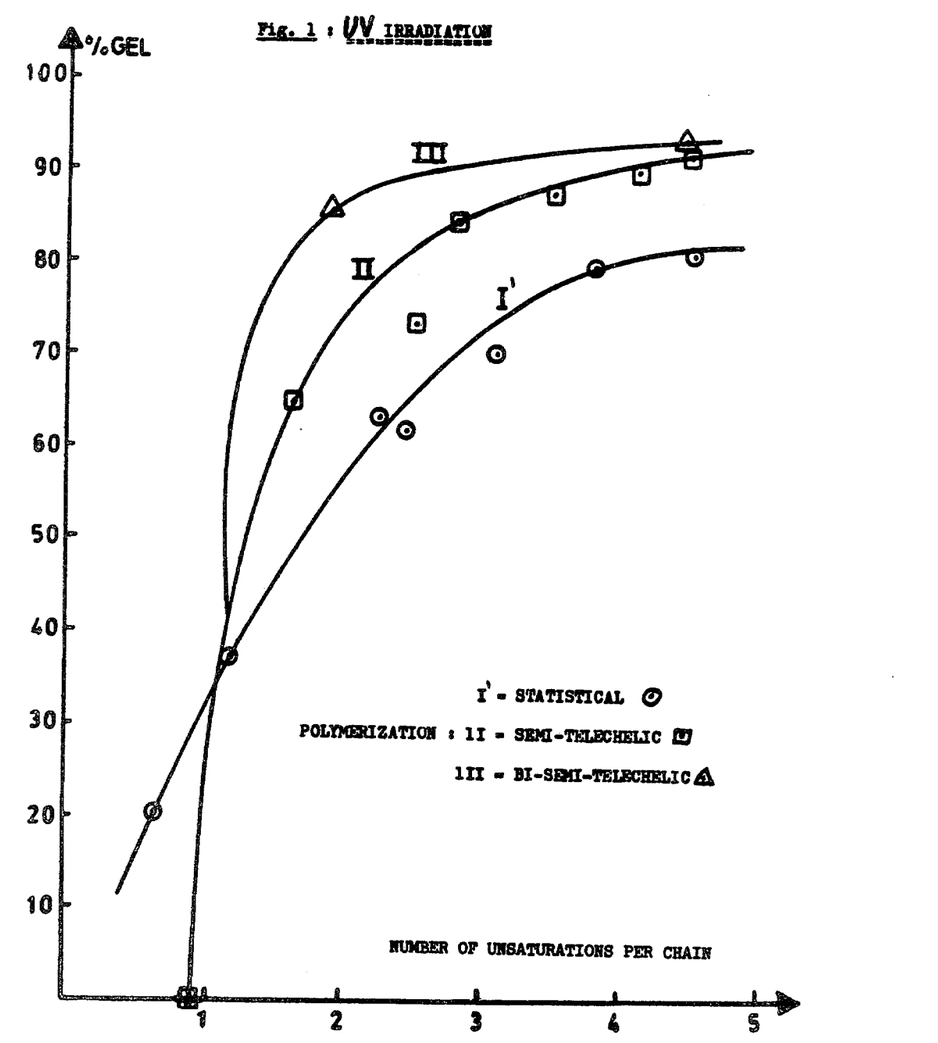
Figure 2:
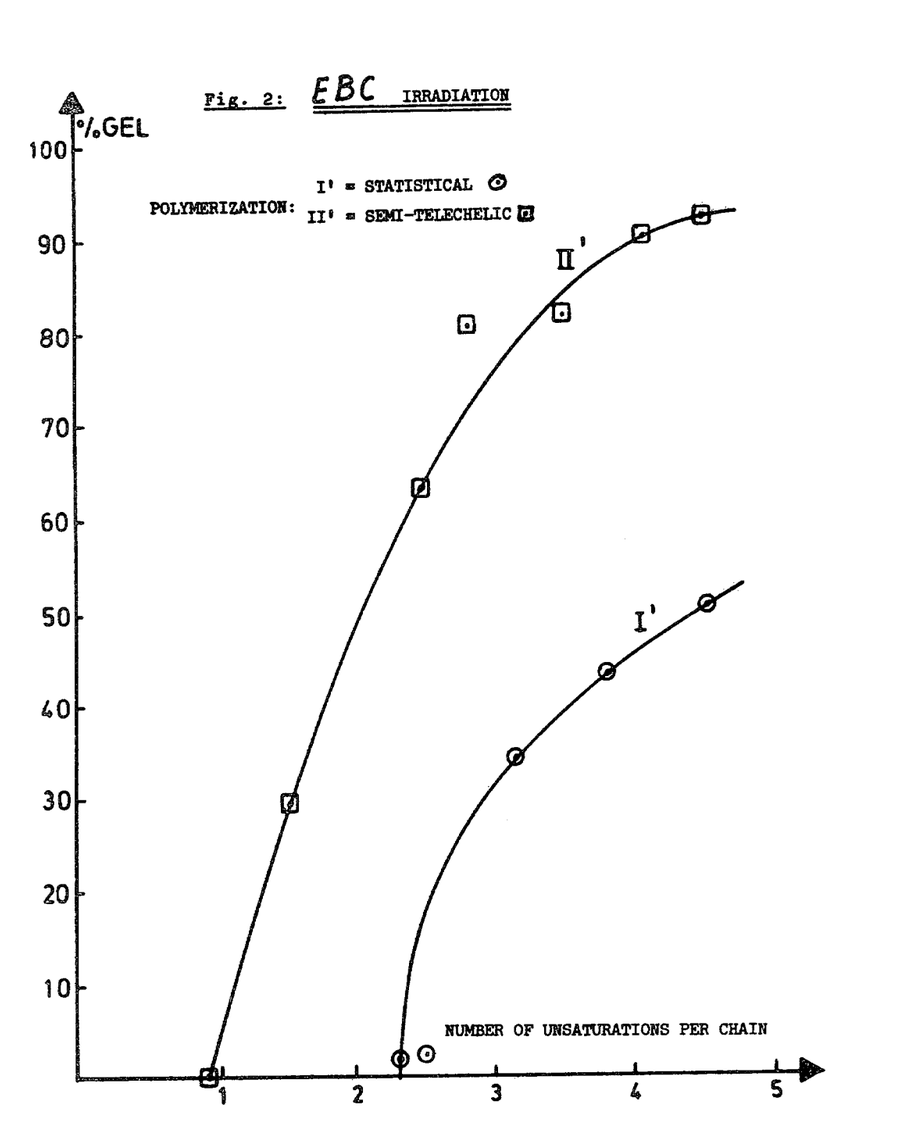

FIG. 1 relates to the polymerization of the prepolymers of Examples 1 to 17 by ultra-violet irradiation; in this Figure, the abcissae show the number of double bonds per polymer chain and the ordinates the percentage of gel formed. Curve I is that of prepolymers having statistical unsaturation not in accordance with the present invention, curve II is that of prepolymers in accordance with the present invention having semi-telechelic unsaturation, while curve III is that of prepolymers in accordance with the present invention having bi-semi-telechelic unsaturation. From the shape of these curves, we see that curves II and III have a much steeper slope than curve I, which means that, for an equal degree of unsaturation, semi-telechelic and bi-semi-telechelic polymers give more gel than polymers having statistical unsaturation. However, when we examine the bottom of these three curves, we see that curves II and III begin with one unsaturation only per chain and that, at this moment, the gel percentage is nil. This is explained by the fact that, at this moment, there is only one unsaturation per chain and that the unsaturation is semi- or bi-semi-telechelic; therefore, it is distributed over each polymer chain. On the other hand, in curve I, with less than one unsaturation per chain, there is already observed a gel formation, which at first sight seems abnormal but is clearly explained in the following manner: as the unsaturation is, in this case, statistically distributed, there are, therefore, chains having one unsaturation but there are others which have none and others which have several and it is obviously the latter which are at the origin of gel formation. However, this apparent handicap of semi-telechelic and bi-semi-telechelic polymers having a low unsaturation content ceases as soon as one unsaturation per chain is exceeded and it will be seen already that for two unsaturation per chain, the gel rate of curves II and III is much greater than that of curve I. Furthermore, when these curves are examined in the area of 4 to 5 unsaturations per chain, it is seen that the percentage of gel for curves II and III exceeds 90%, whereas for curve I, this percentage levels off at about 80%, this being due to the inequality of the statistical distribution of the unsaturation and, consequently to the fact that chains remain which do not contain any unsaturation.

FIG. II graphically represents the results given in Table II (last column) of polymerization by beams of accelerated electrons, curve I' being that of prepolymers having statistical unsaturation, not in accordance with the present invention, of Examples 1 to 7, whereas curve II' is that of the prepolymers having semi-telechelic unsaturation, in accordance with the present invention, of Examples 8 to 14. These curves clearly show the superiority of the compounds in accordance with the present invention, in comparison with the conventional related compounds; thus, whereas with 4.5 double bonds per chain, the gel rate is only 51.2% in Example 7, with the same number of double bonds per chain, the gel rate reaches 92.2% in Example 14.

EXAMPLE 18

Into a double-walled 100 liter enamelled reactor, provided with a stirrer, an azeotropic distillation column, a thermometer, a nitrogen inlet tube and a tube for the admission of the monomers by means of a metering pump, are introduced 22.5 kg. toluene, which is then heated under reflux for 15 minutes. Thereafter, the following mixture is introduced over a period of 3 hours:
  10 kg. methyl methacrylate
  10 kg. ethyl acrylate
  5 kg. 2-hydroxyethyl methacrylate
  0.75 kg. 2-mercaptoethanol
  0.025 kg. azo-bis-isobutyronitrile.

The mixture is heated under reflux for 30 minutes and then the following are introduced into the mixture over the course of 2 hours:
  2.5 kg. toluene and
  0.025 kg. azo-bis-isobutyronitrile.

After heating under reflux for 6 hours, test sampling of the reaction mixture shows that the conversion exceeds 98%. The hydroxyl-containing copolymer thus obtained has the following characteristics:
  content of hydroxyl groups: 1.88 meq OH/g.
  intrinsic viscosity: 7.0 ml/g.
  $\overline{M}_{GPC}=2800$.

The solution is cooled to 50° C., whereafter there are added to the reactor:
  6.48 kg. acrylic acid (twice the amount required)
  0.50 kg. p-toluene-sulfonic acid (2% by weight of copolymer)
  5 kg. hydroquinone (200 ppm in relation to the copolymer).

The mixture is boiled in an atmosphere of nitrogen for 4 hours, while azeotropically separating the water of esterification and returning the toluene to the reactor. After cooling the reaction mixture, a sample is taken for the separation therefrom of the unsaturated prepolymer which has the following characteristics:
  hydroxyl group content: 0.39 meq OH/g.
  unsaturation content: 1.50 meq db/g.
  intrinsic viscosity: 9.0 ml/g.
  molecular weight $\overline{M}_{GPC}=3200$.

The following are added to the cooled solution:
  9.48 kg. butane-1,4-diol diacrylate and
  2.8 kg. hydroquinone.

The solvent is removed from this solution in a thin layer evaporator for high viscosity, with a single pass under the following conditions:
  t° = 95° C.
  $P_{abs}=30$ mm.Hg.
  rotor speed = 500 r.p.m.
  feed rate = 27 liters/hour.

The concentrated solution coming out of the evaporator does not contain any gel and has the following composition by weight:
  68.8% prepolymer
  26.5% butane-1,4-diol diacrylate
  4.4% acrylic acid
  0.7% toluene The solution has an excellent reactivity under UV and EBC irradiation.
  UV: a medium pressure mercury lamp of 1 KW-distance 20 cm., irradiation in an atmosphere of nitrogen 15 seconds irradiation produce 92.2% gel.
  EBC: BBC* accelerator, 300 keV, 50 mA; 10 Mr/second in an inert atmosphere (combustion gas); one 3 Mr irradiation gives 94.3% gel.
*BROWN BOVERI CORP.

EXAMPLE 19

As in Example 18, a mixture having the following composition is copolymerized:
  41 parts by weight methyl methacrylate
  41 parts by weight ethyl acrylate
  18 parts by weight 2-hydroxyethyl methacrylate
  4 parts by weight glyceromercaptan.

The hydroxyl-containing copolymer obtained has the following characteristics:
  2.0 meq OH/g.
  intrinsic viscosity: 6.6 ml/g.
  average molecular weight $\overline{M}_{VPO}=3000$
  average molecular weight $\overline{M}_{GPC}=3000$ After 4 hours esterification with acrylic acid, the unsaturated prepolymer obtained has the following characteristics:
  0.25 meq OH/g.
  1.70 meq db/g.
  intrinsic viscosity: 11.0 ml/g.
  mean molecular weight $\overline{M}_{VPO}=3700$ The GPC distribution presents a broadening in comparison with that of the initial hydroxyl-containing copolymer.

The recovery of the unsaturated prepolymer by the removal of the solvent in a thin layer evaporator gives solutions with the following compositions:
  monomer plasticizer: butane-1,4-diol dimethacrylate (BuDMA); t° = 95° C.; $P_{abs}=15$ mm.Hg.:
  solution 19 A:
  71.5% prepolymer
  26.0% BuDMA
  1.4% acrylic acid
  1.1% toluene monomer plasticizer: butane-1,4-diol diacrylate (BuDA); t°=95° C.; $P_{abs}$=15 mm.Hg.:
solution 19 B:
68.0% prepolymer
29.0% BuDA
1.7% acrylic acid
1.3% toluene.

Reactivity under UV (a medium pressure mercury lamp of 1 KW; distance 20 cm.; irradiation in an atmosphere of nitrogen):
solution: 19A 15 seconds irradiation 50.5% gel
solution: 19B 15 seconds irradiation 98.2% gel.

Reactivity in EBC (apparatus and conditions as in Example 18):
solution 19A: hardening at 7 Mr 93.6% gel
solution 19B: hardening at 2.5 Mr 95.4% gel.

EXAMPLE 20

Synthesis without solvent (a) Preparation of the hydroxyl-containing copolymer

Use is made of a double-walled 3-liter glass reactor, provided with a stirrer with twin helical screw, carefully blown through with nitrogen.

2040 g. of a solution A are first prepared from 1600 g. ethyl acrylate, 400 g. 2-hydroxyethyl acrylate and 40 g. 2-mercaptoethanol. A solution B is then prepared from 1940 g. of solution A, to which 1 g. azo-bis-isobutyronitrile is added. Solution B is introduced over the course of 4 hours into the reactor, while keeping the temperature of the mass at 105° C. The reaction is allowed to proceed for a further 30 minutes at the same temperature and then there is added, over the course of 1 hour, a solution C constituted by the remaining 100 g. of solution A to which 1 g. azo-bis-isobutyronitrile is added and the reaction is allowed to proceed for a further 8 hours at 105° C. By operating in this manner, there is achieved a conversion into hydroxyl-containing copolymer which is greater than 95% by weight. This copolymer has the following characteristics:
intrinsic viscosity: 9 ml/g.
mean molecular weight $M_{GPC}$=4000.

(b) Preparation of prepolymers having semi-telechelic unsaturation b.1. Esterification with acrylic acid The following is introduced into the same reactor as in (a), carefully blown through with nitrogen:
1000 g. of the hydroxyl-containing copolymer prepared in (a)
250 g. acrylic acid (twice the amount theoretically required)
20 g. p-toluene-sulfonic acid (2% in relation to the copolymer)
0.2 g. hydroquinone.

The mixture is then heated to 120° C. for 1.5 hours. Excess acrylic acid is then eliminated by distillation for 30 minutes at an obsolute pressure of about 20 mm.Hg. The unsaturated prepolymer thus obtained has the following characteristics:
1.3 meq db/g.
0.4 meq OH/g.
intrinsic viscosity: 11 ml/g.
mean molecular weight $\overline{M}_{GPC}$=4600

This prepolymer can be dissolved in one of the monomers mentioned hereinunder as soon as its temperature has fallen below 90° C.

b.2. Esterification with maleic anhydride

Under the same conditions as in b.1. the following are charged into the reactor:
1000 g. of the hydroxyl-containing copolymer prepared in (a)
170 g. maleic anhydride and
1 g. lithium carbonate Heating is carried out for 3 hours at 120° C. in the mass. The prepolymer thus obtained, which contains maleic unsaturation, has the following characteristics:
1.5 meq maleic unsaturation/g.
intrinsic viscosity: 11.5 ml/g.
mean molecular weight $\overline{M}_{GPC}$=4400

This prepolymer may be dissolved directly in the monomers mentioned hereinunder.

Reactivities of prepolymers b.1. and b.2.

Reactivity is determined by irradiation with a medium pressure mercury lamp of 1000 watt (Philips HTQ 4) at a distance of 20 cm.; the irradiation is carried out in aluminum dishes, the prepolymer layer being covered with a sheet of "Mylar". For this determination, a solution is prepared from:
65 parts by weight of the prepolymer
35 parts by weight of a monomer
0.5 part by weight benzoin methyl ether
100 ppm hydroquinone.

The duration of irradiation is 1 minute.
The following gel percentages are noted:

| Prepolymer | Monomer | % gel |
|---|---|---|
| b.1. | Methylmethacrylate | 86.8 |
| b.1. | Ethyl acrylate | 91.2 |
| b.2. | Styrene | 44.0 |
| b.2. | Methyl methacrylate | 16.6 |
| b.2. | Ethyl acrylate | 75.8 |

(c) Reaction with tolylene-diisocyanate and then with 2-hydroxyethyl acrylate

Into a reactor, protected from moisture by a column of silica gel, the following are introduced:
1000 g. of the hydroxyl-containing copolymer prepared in (a)
1330 g. butane-1,4-diol diacrylate
2 g. triethylenediamine and then
130 g. tolylene diisocyanate
so that the temperature of the mass does not exceed 60° C. When half the isocyanate groups have disappeared (which is verified by titration), 200 g. 2-hydroxyethyl acrylate are introduced and the reaction is continued until the isocyanate groups have completely disappeared, which generally requires about 4 hours. The solution thus obtained may be used as such.

By adding 0.5% by weight benzoin methyl ether, there is obtained 90% gel by irradiation for 10 seconds under a medium pressure mercury lamp of 1000 watt at a distance of 20 cm., while protecting, during irradiation, the mass of the prepolymer with a sheet of "Mylar" as in the previous Examples.

EXAMPLE 21

(a) Preparation of the carboxyl-containing copolymer

Into a reactor such as that described in Example 1, 950 g. toluene are first introduced. Reflux heating is carried out in an atmosphere of nitrogen and then the following mixture is introduced over the course of 4 hours:
- 930 g. ethyl acrylate
- 70 g. acrylic acid
- 50 g. thioglycolic acid (HS—CH$_2$—COOH)
- 1 g. azo-bis-isobutyronitrile.

Reaction is allowed to proceed for 30 minutes and then, within the course of 1 hour, 50 g. toluene and 1 g. azo-bis-isobutyronitrile are introduced, whereafter reflux heating is continued for 6 hours.

The carboxylated copolymer thus obtained has the following characteristics:
- 1.4 meq COOH/g.
- intrinsic viscosity: 5.4 ml/g.
- mean molecular weight $\overline{M}_{GPC}$: 1900

(b) Esterification with allyl alcohol

The following are charged into the reactor:
- 1000 g. of the carboxyl-containing copolymer solution obtained under (a)
- 81 g. allyl alcohol and
- 10 g. p-toluene-sulfonic acid.

The water of esterification is distilled off azeotropically and is separated and the toluene is returned to the reactor. The reaction takes approximately 10 hours.

The toluene may be easily eliminated by passing the reaction mixture through a thin layer evaporator at 130° C. at an obsolute pressure of about 20 mm.Hg.

The prepolymer has the following characteristics:
- 1.3 meq of allyl unsaturation/g.
- mean molecular weight $\overline{M}_{GPC}$=2000

By irradiating (UV irradiation) a solution containing:
- 65% of the allyl prepolymer
- 35% methyl methacrylate and
- 0.5% benzoin methyl ether with a medium pressure mercury lamp of 1 KW, the following results are obtained:
- 38.8% gel with 10 minutes irradiation and
- 48.6% gel with 20 minutes irradiation.

(c) Esterification with 2-hydroxyethyl acrylate

Esterification is carried out in the manner described in the previous Examples but using:
- 1000 g. of the toluene solution of carboxyl-containing polymer prepared in (a)
- 165 g. 2-hydroxyethyl acrylate
- 10 g. p-toluene-sulfonic acid and
- 1 g. cuprous oxide.

After a reaction time of 8 hours, with the elimination of water of esterification by azeotropic distillation, the reaction solution is diluted with 1000 g. toluene and 0.1 g. hydroquinone is added. The solution is washed twice with 500 g. of a 20% aqueous solution of ammonium chloride, whereafter the prepolymer is isolated by means of double precipitation with hexane and then dried in a vacuum at ambient temperature.

Characteristics of the prepolymer:
- 1.3 meq db/g.
- mean molecular weight $\overline{M}_{GPC}$=2500

The UV irradiation of the prepolymer in admixture with 35% by weight of methyl methacrylate under the conditions mentioned in (b) gives 93.7% gel in 10 minutes.

(d) Esterification with glycidyl methacrylate

- 1000 g. of the toluene solution of the carboxyl-containing polymer prepared in (a)
- 200 g. glycidyl methacrylate
- 10 g. p-toluene-sulfonic acid and
- 1 g. cuprous oxide are introduced into the reactor, esterification is continued for 6 hours at 100° C. and the prepolymer is recovered as in (c).

Characteristics of the prepolymer:
- 1.4 meq db/g.
- $\overline{M}_{GPC}$=2200

UV irradiation in 35% by weight of methyl methacrylate:
- 88.6% gel by irradiation as in (b).

EXAMPLE 22

Sprayable Paint Compositions

White Paint

Solution 19A (see Example 19) is diluted with butane-1,4-diol dimethacrylate up to a content of 25% by weight of prepolymer. By the pigmentation of 100 parts by weight of this solution with 25 parts by weight of titanium dioxide, a white paint is obtained.

Green Paint

Solution 19B (see Example 19) is diluted with butane-1,4-diol diacrylate to give a concentration of prepolymer of 25% by weight. 100 parts by weight of this solution are then pigmented with 25 parts by weight of green chrome oxide.

By means of a spray gun, one layer of 150 g/m$^2$ of each of these paints is applied to asbestos-cement boards. EBC irradiation (i.e. with beams of accelerated electrons) is then carried out, using two different accelerators,
- i.e. one 300 KeV—50 mA BROWN BOVERY CORP. (BBC) accelerator inert gas (combustion gas); dose rate—10 Mr/second
- one 500 KeV—12.5 mA High Voltage Engineering (HVE) accelerator inert gas (nitrogen) dose rate—1 Mr/second The hardening results are as follows:

| paint | dose in Mrads for hardening | |
|---|---|---|
| | HVE | BBC |
| white | 10 | 25 |
| green | 1 | 2.5 |

The coatings have the following characteristics:
- hardness: in excess of 3H
- appearance: perfect (glossy and well spread out film)
- resistance to solvents and water at 60° C.: perfect
- efflorescence test: perfect resistance
- adherence (so-called "cross-cut" test): 100%
- Weather-O-Meter test: paint intact after 1000 hours.

EXAMPLE 23

Paint which can be applied with a roller coater

Paint is prepared having the following composition:
- 58 parts of the solution (on leaving the evaporator) of Example 18
- 42 parts butane-1,4-diol diacrylate
- 42 parts titanium dioxide
- 50 parts chalk
- 6 parts of "Syloid" 74 (silica from GRACE & C°)
- 2 parts of "Aerosil" 200 (colloidal silica).

The composition is then applied with a roller coater to asbestos-cement boards (40×40 cm.), in coats of 20 g/m² and 40 g/m² respectively.

Hardening by EBC irradiation (with BBC accelerator) takes place at a rate of 25 m. per minute (=2.8 Mrads). The coatings have the following characteristics:

Buchholz hardness (DIN 53 153): 130–145
adherence: 100% ("cross-cut" test)
resistance to solvents and water at 60° C.: perfect
efflorescence test: excellent resistance
Weather-O-Meter test: paint intact after 600 hours.

EXAMPLE 24

Coating on fiberboards hardened by UV or EBC irradiation

A coating having the following composition is prepared in a Werner kneader:

UV Coating 85 parts of the solution (on leaving the evaporator) of Example 18
15 parts butane-1,4-diol diacrylate
1 part of "Trigonal" 14 (mixture of isomeric butyl ethers of benzoin, marketed by NOURY & V. D. LANDE)
10 parts of microtalcum AT extra
10 parts barium sulfate
79 parts calcium sulfate (Leichtspath FFF from HARZER GIPSWERKE).

EBC Coating

Same formula as for the UV coating but the "Trigonal" 14 is omitted and the 79 parts calcium sulfate are replaced by 39 parts calcium carbonate and 40 parts titanium dioxide.

These coatings are applied to wood fiberboards as a 150 g/m² coat by means of a reverse roll coater.

The UV coating hardens perfectly in 1 minute under a HTQ4 lamp (1 KW) at a distance of 25 cm.

The EBC coating hardens at a rate of 35 m/min. (=2 Mrads).

The two coatings can easily be sanded (Persoz hardness 130 seconds).

EXAMPLE 25

Paint for curtain application

The following composition is made up:
55 parts of the solution (on leaving the evaporator) of Example 18
45 parts butane-1,4-diol diacrylate
66 parts titanium dioxide
8 parts Shepperd Brown 49 pigment
6 parts of "Syloid" 74 (GRACE).

This paint forms a stable curtain which does not give off a smell. Coats of 120 g/m² are applied to boards previously treated with a pore-sealer and then carefully sanded and de-dusted.

EBC hardening (with a BBC accelerator) takes place at a rate of 25 m. per minute (=2.8 Mrads).

The appearance of the boards is excellent: the paint is glossy and well spread out (pencil hardness=3H), the adherence is 100%, resistance to water and solvents is excellent and the appearance is unchanged after 600 hours exposure in a Weather-O-Meter.

EXAMPLE 26

UV Varnish

Composition of the varnish:
70 parts of the solution (on leaving the evaporator) of Example 18
30 parts butane-1,4-diol diacrylate
0.5 part of "Aerosil" 200
2.5 parts of "Syloid" 74
2 parts of "Trigonal" 14.

This varnish is applied to a glass plate as a 50 micron coat by means of a hand filmograph. Under a UV (1 KW Philips HTQ4) lamp, with irradiation in an atmosphere of nitrogen in an enclosure, the coating reaches a 4H hardness in 25 seconds (97% insolubles in methyl ethyl ketone).

EXAMPLE 27

Chemical Radical Initiation 65 parts of the prepolymer obtained in Example 20 b.2. (maleic unsaturation)
35 parts styrene
* 2 parts of "Butanox" M 50 (methyl ethyl ketone peroxide)
* 0.5 part of NL 49 accelerator (cobalt octoate containing 1% cobalt in dioctyl phthalate)

* (from NOURY & V. D. LANDE).

This composition is poured between 2 plates kept apart by a distance of 2 mm. by an insert running along the perimeter. It is allowed to harden for 16 hours at ambient temperature and then for 2 hours at 100° C. A sheet of plastic material is thus obtained which is transparent, lightly coloured, flexible and hard and contains 89.4% by weight of gel.

EXAMPLE 28

A hydroxyl-containing copolymer is prepared from the following components:
700 parts methyl methacrylate
158 parts ethyl acrylate
142 parts 2-hydroxyethyl acrylate and
20 parts β-mercaptoethanol.

76 g. of the hydroxyl-containing copolymer thus obtained are dissolved in 146 g. toluene in a 1 liter round-bottom flask provided with a stirrer. 35 g. isophorone-diisocyanate, 0.14 g. dibutyl tin dilaurate and 0.04 g. hydroquinone are added to this mixture. The mixture is stirred in an atmosphere of nitrogen at ambient temperature for 10 hours. 40% of the isocyanate groups initially present thus react with the hydroxyl groups of the hydroxyl-containing copolymer. To this mixture there are then added 43.5 g. 2-hydroxyethyl methacrylate, 0.4 g. dibutyl tin dilaurate and 50 g. toluene and the temperature of the mixture is raised to 60° C. After 5 hours reaction at this temperature, no free isocyanate groups are detected in the copolymer obtained. The copolymer is precipitated with ether, filtered off and then dried.

A polymer is thus obtained having a glass transition temperature $T_g$ of 41° C. and a melting point of 81° C. and containing 1.1 meq db/g.

600 parts of this polymer are mixed with 400 parts titanium dioxide, 5 parts of "Modaflow" (from MONSANTO) and 0.5 part dicumyl peroxide.

The film obtained after baking for 20 minutes at 200° C. has good mechanical properties and also has a good resistance to ultraviolet rays and to solvents.

EXAMPLE 29 (OUTSIDE THE SCOPE OF THE INVENTION)

When a hydroxyl-containing copolymer is prepared as in Example 28, but replacing the 20 parts of β-mercaptoethanol by 20 parts n-butylmercaptan, a hydroxyl-containing copolymer is obtained which does not carry a semi-telechelic hydroxyl group. This copolymer, when used in a manner similar to that of Example 28, as a starting material for obtaining a polymer containing olefinic unsaturation, gives a final film having properties which are decidedly inferior to those of the film obtained in Example 28.

We claim:

1. An organic polymer compound having semitelechelic olefinic unsaturation, of the formula:

$$V-W-(X)_x-(Y)_y-H \quad\quad (I)$$
$$\phantom{V-W-(X)_x-}|$$
$$\phantom{V-W-(X)_x-(Y)_y}V$$

in which

V is the radical of an organic compound containing at least one polymerizable $$>C=C<$$

group and another group capable of reacting with the functional groups of organic compounds, the radicals of which compounds are represented by W and Y, W is the radical of a chain transfer agent RHS, R being an organic radical having at least one carboxyl group, X is the radical of at least one ethylenically unsaturated monomer selected from the group consisting of an alkyl ester of acrylic acid or methacrylic acid, acrylamide, methacrylamide, acrylonitrile, methacrylonitrile, vinyl acetate, styrene, alphamethylstyrene and a vinyl ether, Y is the radical of an organic compound containing a polymerizable $$>C=C<$$

group and at least one other reactive group selected from hydroxy, carboxyl, acid anhydride and epoxy groups, y is 0 or a whole number of from 1 to 10, x is the number of moles of X necessary to enable the chain $-(X)_x-(Y)_y-$ to have a molecular weight from 1000 to 10,000 and H is the hydrogen atom detached from the chain transfer agent RSH, the radical RS of which is represented by W in the above formula, $(X)_x-(Y)_y$ being the radical polymerization product of x moles of the organic compound whose radical is designated X and y moles of the organic compound whose radical is designated Y, all of the radicals X and the radicals Y being distributed statistically along the polymer chain $-(X)_x-(Y)_y-$ in accordance with the polymerization kinetics.

2. The compound according to claim 1, wherein the transfer agent is thioglycolic acid, thiolactic acid, 3-mercaptopropionic acid or thiomalic acid.

3. The compound according to claim 1, wherein the compound, the radical of which is represented by Y in formula I, is an ethylenically unsaturated alcohol, an ethylenically unsaturated carboxylic acid, an ethylenically unsaturated carboxylic acid anhydride, an acrylic acid or methacrylic acid monoester of a polyhydroxy compound, glycidyl acrylate or glycidyl methacrylate.

4. A process for the preparation of compounds according to claim 1, wherein, in a first stage, there is prepared, by radical polymerization, a linear polymer of the formula:

$$W-(X)_x-(Y)_y-H \quad\quad (II)$$

in which W, X, x, Y and y have the same meanings as in claim 1, and, in a second stage, the linear polymer of formula II is reacted with an organic compound, the radical of which is designated V in claim 1.

5. The process according to claim 4, wherein in the first stage the radical polymerization is carried out in the absence of a solvent.

6. The process according to claim 4, wherein in the first stage the radical polymerization is carried out in solution in an organic solvent.

7. The process according to claim 4, wherein in the first stage the radical polymerization is carried out in suspension in an aqueous medium.

8. The process according to claim 4, wherein, in the first stage, the monomers, the radicals of which are designated X and Y, are copolymerized in an inert gas atmosphere in the presence of an amount of less than 0.3% by weight of a radical polymerization initiator and from 1 to 10% by weight of a transfer agent, the radical of which is designated W, based on the amount of linear polymer of formula II thus obtained.

9. The process according to claim 4, wherein the second stage comprises esterifying the linear polymer of formula II with an organic compound, the radical of which is designated V, in the presence of a solvent, a polymerization inhibitor and an esterification catalyst, with the elimination, by azeotropic distillation, of the water formed in the course of the esterification.

10. A composition comprising at least one organic polymer compound having semi-telechelic olefinic unsaturation according to claim 1 and at least one olefinically-unsaturated monomer.

11. The composition according to claim 10, wherein the olefinically-unsaturated monomer is an acrylic acid ester, a methacrylic acid ester styrene or vinyl acetate.

12. Paints, coatings, varnishes, compression moulding compositions, injection moulding compositions and casting compositions, whenever containing at least one compound according to claim 1.

13. The compound according to claim 1, wherein the organic compound, the radical of which is designated V in formula I, is an ethylenically unsaturated alcohol, a partial acrylic acid or methacrylic acid ester of a polyhydroxy compound, glycidyl acrylate or glycidyl methacrylate.

14. The compound according to claim 1, wherein the organic compound, the radical of which is designated V in formula I, is an ethylenically unsaturated carboxylic acid, an ethylenically unsaturated carboxylic acid anhydride or a free isocyanate group-containing addition product of a partial acrylic acid or methacrylic acid ester of a polyhydroxy organic compound and an organic diisocyanate.

15. The compound according to claim 1, wherein y is a whole number of from 1 to 10.

16. The composition according to claim 10, which is polymerizable by exposure to heat in the presence of a radical catalyst, by exposure to gamma rays, to X-rays or to accelerated electron beams or by exposure to visible or ultraviolet light in the presence of a benzoin ether as photoinitiator.

* * * * *